United States Patent
Cumin et al.

(10) Patent No.: US 9,433,903 B2
(45) Date of Patent: Sep. 6, 2016

(54) GAS SPARGER FOR A FILTERING MEMBRANE

(75) Inventors: Jeffrey Ronald Cumin, Oakville (CA); Henry Behmann, Puslinch (CA); Youngseck Hong, Oakville (CA); Reid Bayly, Oakville (CA); Zhaoyang Wan, Yardley, PA (US); Joseph Breitner, Thornhill (CA)

(73) Assignee: ZENON TECHNOLOGY PARTNERSHIP, Wilmington, DE (US)

( * ) Notice: Subject to any disclaimer, the term of this patent is extended or adjusted under 35 U.S.C. 154(b) by 703 days.

(21) Appl. No.: 13/394,104

(22) PCT Filed: Jul. 30, 2010

(86) PCT No.: PCT/US2010/043926
§ 371 (c)(1),
(2), (4) Date: Mar. 2, 2012

(87) PCT Pub. No.: WO2011/028341
PCT Pub. Date: Mar. 10, 2011

(65) Prior Publication Data
US 2012/0325742 A1 Dec. 27, 2012

Related U.S. Application Data

(63) Continuation-in-part of application No. 12/553,346, filed on Sep. 3, 2009, now Pat. No. 9,358,505.

(51) Int. Cl.
*B01D 65/02* (2006.01)
*B01D 65/08* (2006.01)
(Continued)

(52) U.S. Cl.
CPC ............... *B01D 65/08* (2013.01); *B01D 61/08* (2013.01); *B01D 61/18* (2013.01); *B01D 65/00* (2013.01);
(Continued)

(58) Field of Classification Search
CPC .. B01D 65/02; B01D 65/08; B01D 2321/18; B01D 2321/185; B01D 2321/40

USPC .................................................. 210/636
See application file for complete search history.

(56) References Cited

U.S. PATENT DOCUMENTS 1,574,783 A  6/1925  Beth
3,068,655 A  12/1962  Murray
(Continued)

FOREIGN PATENT DOCUMENTS

CN  1931419 A  3/2007
CN  101448562 A  6/2009
(Continued)

OTHER PUBLICATIONS

Search Report and Written Opinion from corresponding PCT Application No. PCT/US2010/043926, dated Oct. 21, 2010.
(Continued)

*Primary Examiner* — Katherine Zalasky
(74) *Attorney, Agent, or Firm* — GE Global Patent Operation

(57) ABSTRACT

A gas sparger for a filtering membrane system produces an intermittent flow of bubbles even if provided with a relatively continuous gas flow. The sparger has a housing to collect a pocket of gas and a conduit to release some of the gas from the pocket when the pocket reaches a sufficient size. Optionally, a cover over an outlet from the conduit may break up or distribute the released gas. A large sparger for can comprise a plurality of smaller units or areas. The supply of gas to the sparger may vary in flow rate over larger periods of time in response to changes in conditions in the membrane system to change the time between consecutive bursts of bubbles. A gas supply pipe may have two or more outlets at different elevations in communication with each of two or more units or areas.

6 Claims, 5 Drawing Sheets

(51) Int. Cl.
*B01D 61/12* (2006.01)
*B01D 61/22* (2006.01)
*B01D 61/08* (2006.01)
*B01D 61/18* (2006.01)
*B01D 65/00* (2006.01)
*B01F 3/04* (2006.01)
*C02F 1/44* (2006.01)

(52) U.S. Cl.
CPC ........... *B01D 65/02* (2013.01); *B01F 3/04241* (2013.01); *B01D 61/12* (2013.01); *B01D 61/22* (2013.01); *B01D 2313/26* (2013.01); *B01D 2315/06* (2013.01); *B01D 2321/185* (2013.01); *B01D 2321/26* (2013.01); *B01F 2003/04304* (2013.01)

(56) References Cited

U.S. PATENT DOCUMENTS

| | | |
|---|---|---|
| 3,246,761 A | 4/1966 | Bryan |
| 3,592,450 A | 7/1971 | Rippon |
| 3,628,775 A | 12/1971 | McConnell |
| 3,847,508 A | 11/1974 | Mowen |
| 3,898,018 A | 8/1975 | Weis |
| 4,169,873 A | 10/1979 | Lipert |
| 4,187,263 A | 2/1980 | Lipert |
| 4,356,131 A | 10/1982 | Lipert |
| 4,439,316 A | 3/1984 | Kozima |
| 4,478,211 A | 10/1984 | Haines |
| 4,569,804 A | 2/1986 | Murphy |
| 4,676,225 A | 6/1987 | Bartera |
| 4,752,421 A | 6/1988 | Makino |
| 4,789,503 A | 12/1988 | Murphy |
| 4,828,696 A | 5/1989 | Makino |
| 4,906,363 A | 3/1990 | Makino |
| 4,911,838 A | 3/1990 | Tanaka |
| 4,923,614 A | 5/1990 | Engelbart |
| 5,169,781 A | 12/1992 | Nojima |
| 5,605,653 A | 2/1997 | DeVos |
| 5,618,431 A | 4/1997 | Kondo et al. |
| 5,620,891 A | 4/1997 | Drummond |
| 5,783,083 A | 7/1998 | Henshaw et al. |
| 6,162,020 A | 12/2000 | Kondo |
| 6,245,239 B1 | 6/2001 | Cote |
| 6,899,812 B2 | 5/2005 | Cote et al. |
| 7,017,557 B2 | 3/2006 | Rumpf |
| 7,022,231 B2 | 4/2006 | Mahendran et al. |
| 7,294,255 B2 | 11/2007 | Kondo |
| 7,867,395 B2 | 1/2011 | Ekholm |
| 7,879,229 B2 | 2/2011 | Phagoo |
| 2003/0178369 A1 | 9/2003 | Eguchi et al. |
| 2005/0006308 A1 | 1/2005 | Cote |
| 2006/0201876 A1 | 9/2006 | Jordan |
| 2007/0039888 A1 | 2/2007 | Ginzburg et al. |
| 2007/0166171 A1 | 7/2007 | Kondo |
| 2009/0194477 A1 | 8/2009 | Hashimoto |
| 2009/0215142 A1 | 8/2009 | Tsai et al. |
| 2010/0300968 A1 | 12/2010 | Liu |
| 2011/0100907 A1* | 5/2011 | Zha et al. .................... 210/615 |

FOREIGN PATENT DOCUMENTS

| | | |
|---|---|---|
| EP | 0937494 A2 | 8/1999 |
| EP | 1119522 B1 | 4/2004 |
| EP | 1652572 B1 | 5/2006 |
| EP | 1897857 A1 | 3/2008 |
| GB | 996195 A | 6/1965 |
| JP | 62262185 A | 11/1987 |
| JP | 62268838 A | 11/1987 |
| JP | 1104396 A | 4/1989 |
| JP | 1111494 A | 4/1989 |
| JP | 4265128 A | 9/1992 |
| JP | 7185270 A | 7/1995 |
| JP | 7185271 A | 7/1995 |
| JP | 0810589 A | 1/1996 |
| JP | 8141566 A | 6/1996 |
| JP | 8312161 A | 11/1996 |
| JP | 9038470 A | 2/1997 |
| JP | 9220569 A | 8/1997 |
| JP | 2003340250 A | 12/2003 |
| JP | 2004322100 A | 11/2004 |
| JP | 2006081979 A | 3/2006 |
| WO | 9706880 A2 | 2/1997 |
| WO | 9828066 A1 | 7/1998 |
| WO | 0021890 A1 | 4/2000 |
| WO | 2004050221 A1 | 6/2004 |
| WO | 2004056458 A2 | 7/2004 |
| WO | 2005105275 A1 | 11/2005 |
| WO | 2006029465 A1 | 3/2006 |
| WO | 2006066319 A1 | 6/2006 |
| WO | 2008144826 A1 | 12/2008 |
| WO | 2008153818 A1 | 12/2008 |
| WO | 2011028341 A1 | 3/2011 |

OTHER PUBLICATIONS

Mini-Ject Above-Grade Ejector Lift Station, http://smithandloveless.com/cgi-local/H2O/H2O.cgi?db+pumps & website=&language, printed Jan. 28, 2009.

Infilco Degremont, Infilco Cannon Mixer—Enhanced Sludge Mixing Technology, downloaded from http://www.degremont-technologies.com/IMG/pdf/INFILCO-CannonMixer-EN-US.pdf Oct. 1, 2012.

Cannon™ Mixer Product Page.

PCT Search Report and Written Opinion issued in connection with corresponding Application No. PCT/US2011/054530 on Apr. 27, 2012.

Unofficial English Translation of Chinese Office Action is issued in connection with corresponding CN Application No. 201180049733.9 on May 26, 2014.

US Final Office Action issued in related U.S. Appl. No. 12/905,701 dated Jan. 23, 2015.

US Office Action issued in related U.S. Appl. No. 12/905,701 dated May 8, 2012.

US Final Office Action issued in related U.S. Appl. No. 12/905,701 dated Oct. 25, 2012.

US Non Final Rejection issued in related U.S. Appl. No. 12/905,701 dated Jul. 8, 2014.

Jeffrey Ronald Cumin et al., U.S. Appl. No. 12/905,701, filed Oct. 15, 2010.

* cited by examiner

GAS SPARGER FOR A FILTERING MEMBRANE

For the United States of America, this application is a continuation in part of U.S. application Ser. No. 12/553,346 filed on Sep. 3, 2009 now U.S. Pat. No. 9,358,505. U.S. application Ser. No. 12/553,346 is incorporated herein in its entirety by this reference to it.

FIELD

This specification relates to a gas sparger and to gas scouring to inhibit fouling of a filtering membrane.

BACKGROUND

The following background discussion is not an admission that anything discussed below is citable as prior art or common general knowledge.

International PCT publication WO/2000/021890 describes, among other things, an aeration system for a submerged membrane module that has a set of aerators connected to an air blower, valves and a controller adapted to alternately provide a higher rate of air flow and a lower rate of air flow in repeated cycles to individual aerators. In some systems, an air blower, valves and controller provide simultaneous but alternating air flows to two or more sets of aerators such that while the total system air flow is constant, allowing the blower to be operated at a constant speed, each aerator receives a flow of air that varies over time. Transient flow conditions result in the tank water, which helps avoid dead spaces and cleans or inhibits fouling of the membranes. WO/2000/021890 is incorporated herein in its entirety by this reference to it.

INTRODUCTION

The following discussion is intended to introduce the reader to the more detailed discussion to follow, and not to limit or define any claim.

The air cycling process described in WO/2000/021890 has proven to be very effective at reducing the amount of air or other gas, and therefore energy, required to operate a filtering membrane system. It was noted in WO/2000/021890 that rapid valve movements result in very large bubbles being created for a brief period of time, and that these very large bubbles might be particularly useful in inhibiting membrane fouling. However, it was also noted in WO/2000/021890 that the rapid valve movements caused temporary pressure spikes in the aeration system that needed to be managed. A gas sparger, alternately called an aerator, will be described below that produces an intermittent flow of bubbles even when provided with a continuous gas flow. The flow of bubbles can be in the form of short bursts of very large bubbles, but rapid valve movements are not required.

The sparger has a housing to collect a pocket of gas and a conduit to release at least some of the gas from the pocket when the pocket reaches a sufficient size. Optionally, a cover over an outlet from the conduit may distribute the released gas, and may also break up the gas into bubbles, or smaller bubbles, if the gas was initially released in a more nearly bulk form. A large sparger for use with a commercial membrane module or cassette can comprise a plurality of smaller units or areas. Even if fed with a continuous supply of gas at a constant rate, the sparger produces an output flow of bubbles that varies in rate over time. Optionally, the output flow is in the form of generally discrete periods of bubble flow, further optionally in the form of short bursts of large bubbles. For example, the duration of a burst of bubbles may be one half or less than the time between consecutive burst of bubbles.

The supply of gas to the sparger, even if continuous over a period of time including several bursts of bubbles of more, may vary in flow rate over larger periods of time. A change in the supplied gas flow rate does not cause a significant change in the flow rate and duration of output bursts of bubbles. However, a change in the supplied gas flow rate does change the time between consecutive bursts of bubbles. A gas supply pipe is described herein having two or more outlets for supplied air to flow into each of two or more spargers. The two or more outlets are located at different elevations. Such a gas supply pipe allows for a greater range in the input gas flow rate while delivering a generally equal or other desired division of the supplied gas to the multiple spargers.

A method of operating a sparger is described herein in which the supplied gas flow rate varies in response to system operating parameters.

An aeration system is described herein in which one or more of a set of spargers receives a supplied gas at a higher flow rate. The one or more spargers receiving the higher rate of supplied gas are located near areas of a membrane system requiring an increased amount of output bubble flow.

Another sparger described herein has distinct areas for releasing bubbles fluidly connected such that the release of bursts of bubbles from the distinct areas is generally synchronized.

DETAILED DESCRIPTION

Figure 1:
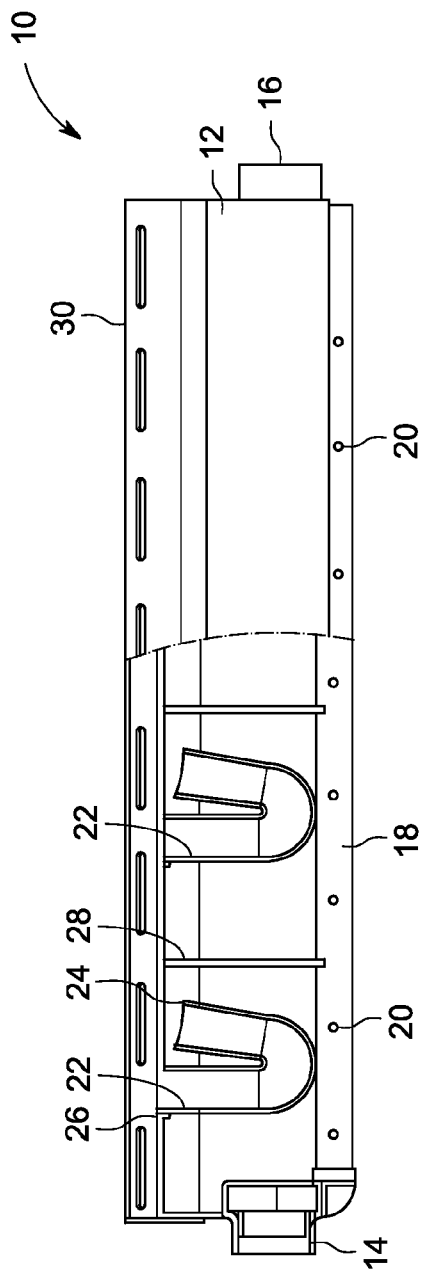
FIG. 1 shows a partially sectioned side elevation view of a sparger.
Figure 2:
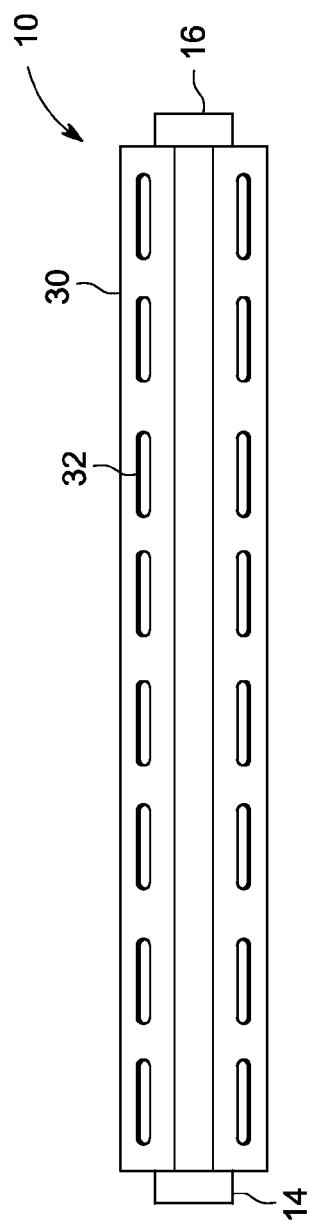
FIG. 2 shows a top view of the sparger of FIG. 1.
Figure 3:
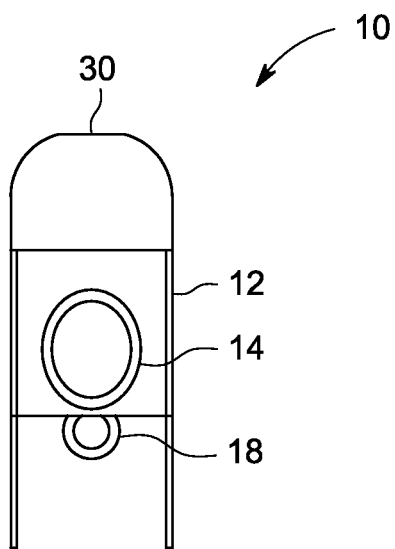
FIG. 3 shows an end view of the sparger of FIG. 1.
Figure 4:
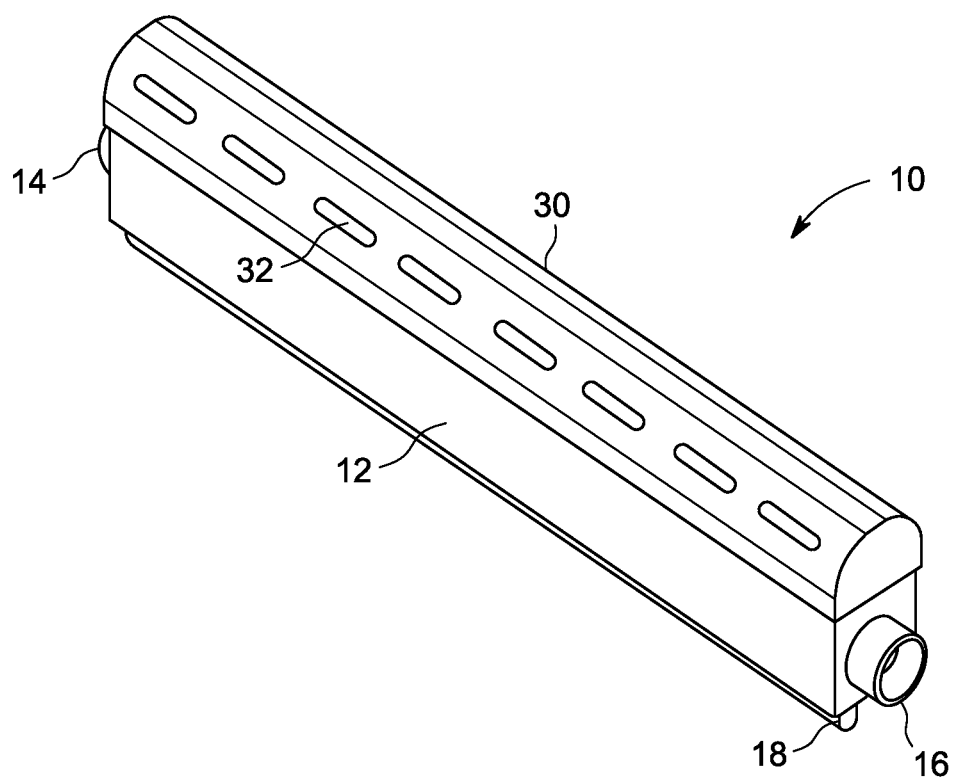
FIG. 4 shows an isometric view of the sparger of FIG. 1.

FIGS. 1 to 4 show a sparger 10 in various views. Sparger 10 has a housing 12 defining an interior chamber bounded by an upper surface. The housing 12 shown is elongated, with its length being more than twice its width, and has a generally inverted "U" cross section, although other shapes may also be used. The housing 12 shown has a connection 14 at one end. Connection 14 can be fit into or over a port in a gas supply manifold (not shown) to provide gas to the sparger 10 and to hold one end of the sparger 10 in a selected position immersed in a liquid. The other end of the sparger 10 may be held in a selected position immersed in a liquid by a pin 16 extending from the housing 12.

The connector 14 is connected to one or more distribution pipes 18. The distribution pipe or pipes 18 extend generally along the length of the sparger 10 and have gas outlets 20 along their length. The size of the gas outlets 20 may be made sufficiently small relative to the gas flow rate so as to (a) create a head loss that encourages an even distribution of gas flow from the gas outlets 20 even if the distribution pipe 18 is not exactly level and (b) cause a sufficient velocity of gas flow through the gas outlets 20 to inhibit liquid entry into the distribution pipe 18. A distribution pipe 18 may be located near the bottom of sparger 10 as shown or at other elevations. For example, distribution pipes 18 may be located along the top of housing 12, with the outlets 20 in an area that always contains a pocket of gas. Further optionally, different parts of the housing 12 may receive gas from separate gas tubes connected to a gas supply manifold located further away from the housing 12.

The sparger 10 has a plurality of discharge conduits 22 along its length. Discharge conduits 22 have first outlets 24 in communication with an area inside and near the top of the housing 12, and second outlets 26 open to the outside of the housing 12. At least a portion of the conduit 22 extends downwards between the first opening 24 and the second opening 26. Another portion of conduit 22 extends upwards again before reaching the second opening 26. Gas leaving the housing 12 through the conduit 22 must pass through a low point in the conduit 22 between the first opening 24 and the second opening 26, as in the generally J or U shaped conduits 22 shown. Second opening 26 may have an area of 1 to 10 square cm or 3 to 6 square cm. The cross-sectional area of a pocket of gas in communication with a conduit 22 is preferably larger than the area of the second opening 26 by a factor of 10 or more, for example by a factor in the range of 20 to 35.

Adjacent conduits 22 are preferably separated from each other, for example by dividers 28. The dividers 28 prevent one conduit 22 from depleting a pocket of gas in housing 12 to the extent that gas is rarely or never discharged from another one of the conduits 22. With solid dividers 28 extending to below the lowest expected extent of a gas pocket in housing 12 as shown, gas pockets associated with different conduits 22 are fluidly separated from each other. The sparger 10 acts as if it is a number of distinct smaller spargers. Over a period of operation, the timing of gas discharges from different conduits 22 in a sparger 10 may vary or scatter such that gas is not discharged from each conduit 22 at the same time. However, the pattern of gas discharge from an individual conduit appears to follow a generally regular cycle having a short burst of gas followed by a period in which gas is not discharged, or is discharged in only small amounts.

A cover or distributor 30 may optionally be provided over the housing 12. Cover 30 receives gas from one or more discharge conduits 22 and discharges gas in the form of bubbles from holes 32 in the cover 30. Cover 30 may have a plurality of holes 32 per conduit 22 to disperse the gas flow over a larger horizontal area. The cover 30 may also break a burst of gas leaving conduit 22 into bubbles or smaller bubbles if desired. As shown, the cover 30 may have dividers generally aligned with dividers 18 in the housing 12 to keep a flow of bubbles near the conduit 22 that released the gas for those bubbles. Optionally, holes 32 may be distributed either along the length of the housing 12 or across the width of housing 12 or both to spread the flow of bubbles as desired for one or more immersed membrane modules intended to be scoured by the bubbles. A module may be located above the sparger 10 in a tank. Optionally, the tube sheet of a module having air passages through the tube sheet between the membranes can function as the cover 30. Further optionally the conduit 22 may extend through a tube sheet of a membrane module such that the second opening 26 is located above the tube sheet. In this case, a cover 30 or other diffuser may be placed over the second opening and above the tube sheet. These options may be useful for modules with round or square headers having a significant width or diameter such that it is necessary to discharge bubbles between the membranes. However, for modules that allow good bubble penetration into the membrane bundle without requiring internal aeration, it is preferable to locate the sparger 10, including any cover 30, under the tube sheet of the module. In the case of a cassette of modules, the sparger 10 may be located under a module or below a gap between modules. Separating the sparger 10 from the module also allows the module or the sparger 10 to be removed independently for cleaning or maintenance, allows a sparger 10 to be made available for multiple or pre-existing modules, and allows a range of sparger 10 shapes or sizes to be available for use under a module depending on the process conditions.

Cover 30 shown snaps over the housing 12 without making a gas tight seal with the top of housing 12. However, in the embodiment shown, the housing 12 and cover 30 both have a dome shape in cross section such that a gap between the cover 30 and housing 12 is located below the top of housing 12. With this arrangement, gas does not escape through the gap between the cover 30 and housing 12 at the gas flow rates tested by the inventors. The volume contained within cover 30 is preferably small, for example about 50% or less, or 33% or less, of the volume of an associated air pocket in housing 12. This tends to maintain the short burst characteristics of the gas leaving a conduit 22.

Figure 5:
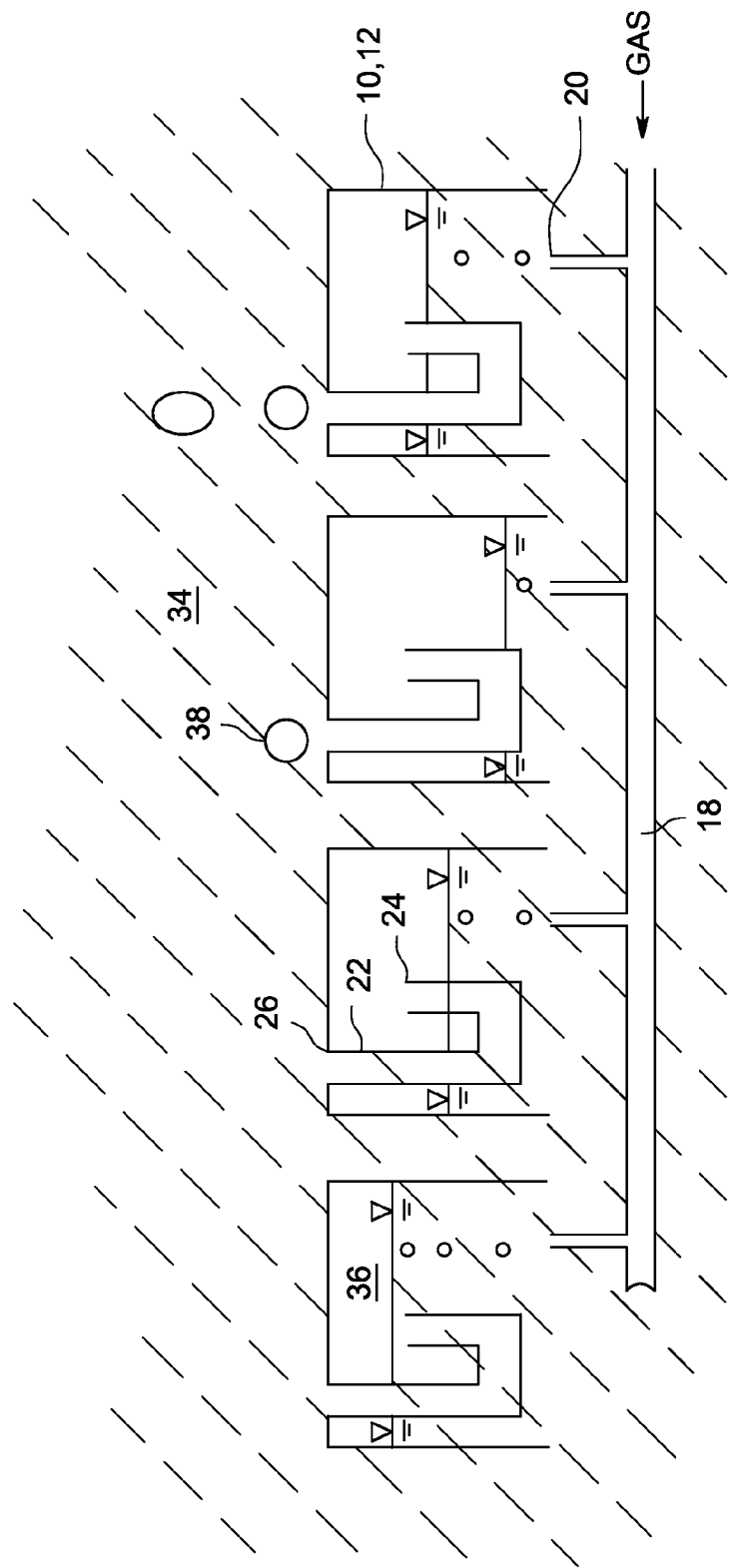
FIG. 5 shows a schematic side view of four spargers immersed in a liquid at various stages in an aeration process.

The operation of a sparger 10 immersed in a liquid 34 is illustrated schematically in FIG. 5. Parts A, B, C and D of FIG. 5 show a sparger 10 at four different points in a sequence of events that occurs in the sparger 10 as a gas is fed into it. The sequence progresses from condition A to B to C to D and then returns to condition A and repeats for as long as a supply of a gas is provided to a sparger 10. In Part A of FIG. 5, a conduit 22 is flooded with liquid 34, although a pocket of gas 36 may be trapped in the housing 12. In Part B, the pocket of gas 36 grows in size as gas from distribution pipe 18 is collected in housing 12 and displaces liquid 34. Liquid 34 leaves the housing 12 through an opening to the bottom of the housing 12 and through conduit 22. In Part C, after the expanding pocket of gas 36 extends below the upper bound of a low point in conduit 12, a path is created for gas to flow from the pocket 36 and through the conduit 22, and gas is discharged outside of the housing 12, for example in bubbles 38. In Part D, gas continues to flow through the conduit 22, liquid 34 re-enters the housing 12 and the pocket 36 becomes smaller. Returning to Part A, the liquid 34 inside of the housing 12 eventually reaches the conduit 22, the conduit 22 floods, and gas flow through the conduit 22 stops. The process then repeats, producing discrete periods of gas discharge even when gas is supplied continuously. The periods of gas discharge tend to be near an average duration and frequency. However, the precise timing, volume and duration of a gas discharge may vary within a range around the average, for example, with waves or other movement of the liquid or the discharge of gas from other spargers 10.

FIGS. 1 to 4 are drawn to scale. The sparger 10 is 85 mm wide, 139 mm high and 770 mm long. These dimensions are given to provide an example of a workable sparger, but the invention is not limited to these dimensions. The sparger 10 shown was designed to replace an aerator tube normally provided below a cassette of ZeeWeed™ 500 membrane modules by GE Water and Process Technologies, and to use the same fittings. These modules are intended for immersed, suction driven operation. The module has many hollow fiber membranes with a total surface area of about 200 to 525 square feet. The membranes are oriented vertically between a pair of elongated potting heads. The modules are generally rectangular in plan view, having a length about the same as the length of the sparger 10. The modules are arranged into cassettes in which several modules placed side by side in a frame separated by vertical gaps between adjacent modules. One sparger 10 is placed about 1 to 10 cm below every second module and oriented parallel with the module. Holes 32 are positioned to direct bubbles into the gaps on either side of the module. Each sparger 10 provides bubbles to the both sides of the module above it, and to one side of the adjacent modules on both sides of that module. When fed with air at about 4 cubic feet per minute, the sparger 10 shown releases bursts of bubbles lasting for about 1 or 2 seconds about every 8 seconds. Increasing or decreasing the rate of gas flow to the sparger 10 has very little, if any, effect on the duration of the burst of bubbles, but decreases or increases the time between bursts. Dimensions, ratios of dimensions, gas flows and process parameters within a range of plus to minus 50% of the values provided in this document are expected be suitable for typical commercial immersed suction driven membrane applications but other dimensions, relative proportions and gas flow rates may also be useful. Other variations are also possible. For example, a square or circular sparger 10, optionally divided into sections appropriate for those shapes, may be used for modules of other shapes. Conduit 22 may be one of a variety of shapes that provide the required passage.

Figure 6:
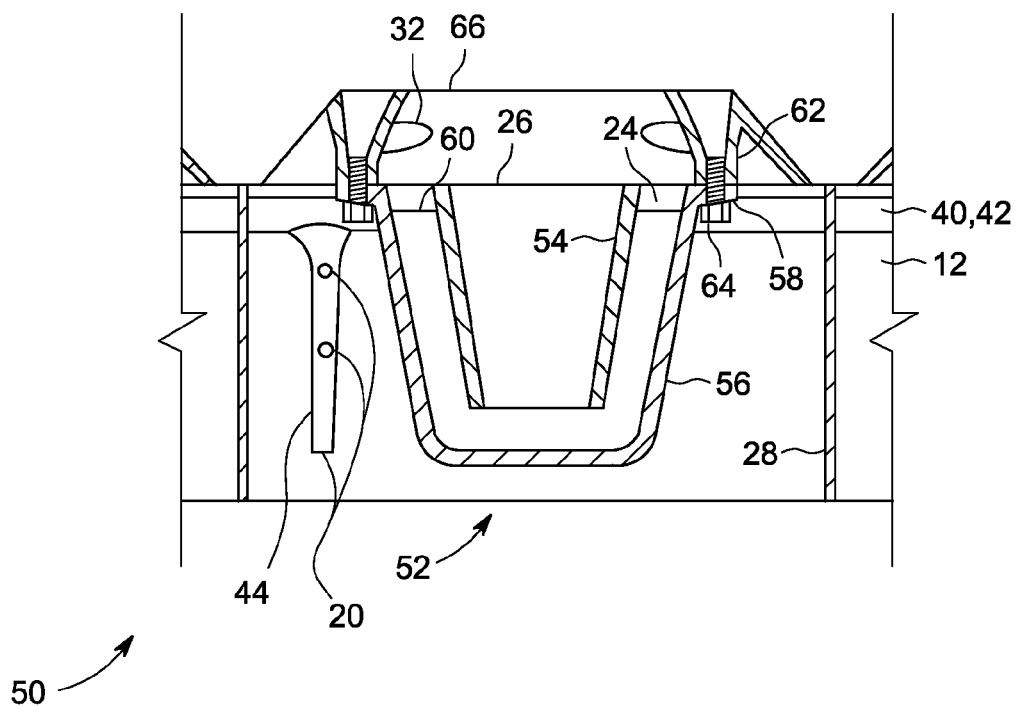
FIGS. 6 and 7 show a top view and a sectioned side view of another sparger.
Figure 7:
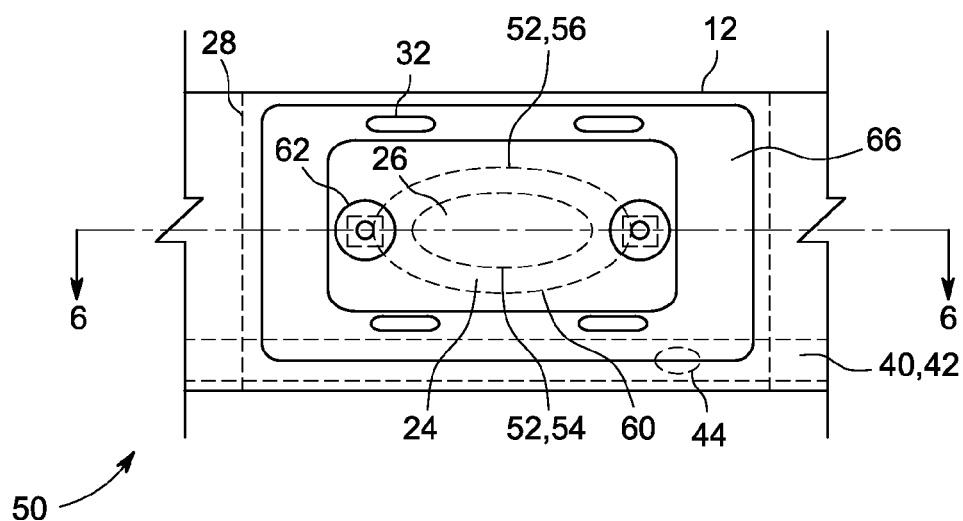

FIGS. 6 and 7 show a section of an alternative sparger 50 including one distinct area of the sparger 50 between two dividers 28 and parts of two adjacent areas. The sparger 50 may have, for example, 2 to 10 distinct areas. Optionally, though not shown, the sparger 50 may be made of a plurality of distinct units, each configured to provide one area generally as shown but with each unit having one closed end and one open end. In that way, any number of units may be attached together to form a sparger 50 of any desired length.

The alternative sparger 50 has a housing 12 with a generally rectangular open bottomed cross-section. A two-part discharge conduit 52 is formed from a spout 54 molded into the top of the housing 12 surrounded by a cup 56. The cup 56 is attached to the top of the housing 12 over the spout 54 by way of mounting flanges 58. The mounting flanges 58 also space a rim 60 of the cup 56 from the top of the housing 12 to form a first outlet 24. The top of the spout 54 provides a second outlet 26. After accumulating in a pocket and pushing water in the housing 12 to below the bottom of the spout 54, gas leaves the housing by flowing in a J or U shaped path from the rim 60 of the cup 56, down to and around the bottom of the cup 54, and then upwards through the spout 54. A cover section 66 may be fastened to the housing 12 by way of a mounting lug 62 located to receive a bolt 64 also passing through the flange 58 of the cup 56. The housing 12 is subdivided into distinct areas by dividers 28 and the ends of the housing 12 (not shown), and a two-part discharge conduit 52 is located in each of the distinct areas. A cover section 66 may be located over each area of the housing 12 as shown, or a larger cover may be provided over multiple areas, optionally with internal dividers, as described previously. The sparger 50 is easily cleaned after unbolting the cup 54 and cover section 60. A variety of cups 54 may be made available with different shapes or rim 60 heights to allow for a selection of available bubble burst gas volumes, gas flow rates or burst durations.

Figure 8:
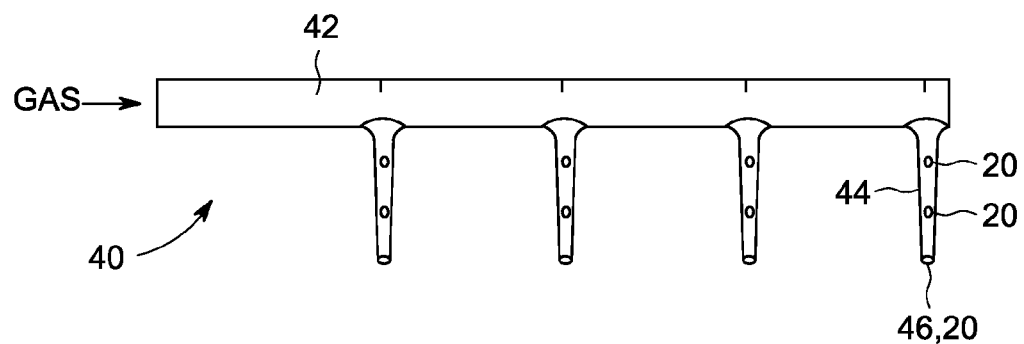
FIG. 8 shows an alternative feed air manifold.

FIG. 8 shows a side view of an input gas distribution manifold 40 shown in FIG. 7, and also useful in the first sparger 10 described above. The distribution manifold 40 comprises a horizontal conduit 42 connected to a plurality of downpipes 44. The downpipes 44 are spaced along the horizontal conduit such that when the gas distribution manifold 40 is installed in a sparger 50, at least one downpipe 44 will be located in each distinct area of the sparger 50 as defined by the dividers 28. An equivalent manifold structure may also be molded into the housing 12 of a sparger 10, 50.

Each downpipe 44 has a plurality of gas outlets 20 at different elevations to emit gas into the sparger areas. Each downpipe 44 may have an outlet 20 of the same size, and at the same elevation, as a corresponding outlet 20 in each of the other downpipes 44. Each downpipe 40 shown has an upper outlet 20, a middle outlet 20 and a bottom opening 46, which functions as a lower gas outlet 20. The bottom opening 46 also allows water to enter or drain from the downpipe 44 depending on the inlet gas flow rate.

In operation, at a first range of input gas flow rates the gas will only be emitted into the sparger 50 through the upper outlets 20 of each downpipe 44. The size of the upper outlets 20 is chosen to provide a generally even distribution of gas flow from the downpipes 44 at input gas flow rates within the first range. As the input gas flow rate is increased, water in the downpipes 44 will be displaced downwards. At a second range of input gas flows, the middle outlets 20 will also emit gas into the sparger 50. The size of the middle outlets 20 is chosen such that the combined areas of the upper and middle outlets 20 produces a generally even distribution of gas flow from each downpipe 44 at input gas flows within the second range. If the input gas flow rate is further increased, gas can be discharged from the downpipes 44 through the bottom openings 46. The bottom openings 46 also allow the manifold 40 to drain out any water that may enter through the outlets 20, for example while the system is temporarily shut down for maintenance or inspection. Optionally, the bottom openings 46 can be sized to produce a generally even distribution of gas flow through the downpipes 44 when the input gas flow rate is within a third range that causes air to be released through the bottom openings 46. In this way, a range of input gas flow rates can be accommodated while still providing a generally even distribution of gas flow from the downpipes 44. In contrast, with the gas distribution pipe 18 described above, at low input gas flow rates the outlets 20 may be too large to provide an even distribution of the gas and at high gas flow rates the outlets 20 may provide excessive head loss in the gas supply system or foaming in the sparger 10. Further, while a drain can be provided by adding an open bottomed pipe extending downwards from the end of the gas distribution pipe 18 described previously, the drain pipe must be very long if high input gas flow rates may be applied to the gas distribution pipe 18 since a localized overflow of gas from a single drain would be undesirable.

Optionally, the middle outlets 20 may be omitted. Further optionally, the upper outlets 20 may be located in the horizontal pipe 42 rather than the downtubes 44. However, locating the upper outlets 20 in the downtubes 44 tends to preserve a more even distribution of the gas and decreases flows of gas from one area of the sparger 50 to another through the manifold as adjacent areas of the sparger 50 discharge bubbles at different times. Further optionally, the manifold 40 can be flooded from time to time to remove accumulated solids by temporarily closing a gas inlet valve or venting the inside of the manifold 40 to atmosphere, or both. After the manifold 40 has been flooded, a gas may be supplied at sufficient pressure to send bubbles out through the lower openings 20 and thereby flush solids out of the manifold 40. Manifold 40 cleaning may be done at regular intervals or when plugging is noted, for example by an increase in back pressure in the gas feed system.

The supply of gas to the sparger 50, and therefore the time between bursts of bubbles, may be varied in consideration of one or more operational or performance parameters of the membrane system. The considered parameters may be, for example, one or more of resistance, transmembrane pressure, or permeability. The parameter may be observed or calculated periodically, for example at the beginning or end of a permeation step within a filtration cycle having a series of permeation steps separated by backwashing or relation steps. The parameter may also be a moving average of multiple measurements from a series of cycles or a trend or rate of change in a value. The parameter may be used to determine whether the gas supply flow rate should be maintained, increased or decreased.

In one example of a process, one or more parameters are sampled periodically and used, optionally after a mathematical combination or conversion, to produce an observed value X at each of a series of polling intervals. In each polling interval, the observed value X is compared to an upper and lower threshold value, A and B, that have been pre-determined to represent the limits of a desired operation of the membrane system. The threshold values A and B may be set during the design or piloting of the system, or they may be adjusted over time. Adjustments over time may account for variations in the conditions of the membrane such as a change in pore size, age, or the cumulative amount of water that has been treated by the membranes. Adjustments to the threshold values may also be made considering changes in characteristics of the water being treated such as solids concentration or temperature. Alternatively, the observed value X can be adjusted to reflect the conditions that were assumed to set the threshold values. For example, observed flux through the membrane can be adjusted based on the temperature of the water being filtered before comparing it to a threshold value selected assuming a different water temperature.

In the example process, if the observed value X exceeds the upper threshold value A at a polling interval, then the input gas feed rate is increased by a pre-selected amount, for example 5% or 10%. If the observed value X is between the upper and lower threshold values, or equal to one of them, then the input gas feed rate is not changed. If the observed value X is lower than the lower threshold value B, then the input gas flow rate is decreased by a pre-selected amount, for example 5% or 10%. Alternatively, the extent to which the observed vale differs from the nearest threshold value, or an overage of the threshold values, may be used to estimate a required variation in the input gas flow rate. Preferably, a minimum input gas feed rate is also specified, for example as determined by the greater of (a) the lowest input gas feed rate that produces a generally equal division of flow from the upper outlets 20 of the gas manifold 40 and (b) the lowest input gas feed rate that will satisfy other process requirements such as mixing in the membrane vessel.

Increasing or decreasing the input gas flow rate to the sparger has very little effect on the duration of a burst of bubbles but increases or decreases the time between bursts. The control method described above results in the time between bursts varying over a long period of time, for example a day or more, although the time between bursts is likely to be constant over shorter periods of time, for example throughout an hour of operation. The time between gas bursts, measured from the start of one burst to the start of the next air burst, may vary for example from 2 to 60 seconds or from 4 to 20 seconds. The input air flow rate at all times is near the minimum required to provide performance above the lower threshold value.

Optionally, the even distribution of air between areas of the sparger 50 may be intentionally modified. For example, a first and last downpipe 44 may have a larger upper outlet 20 or an additional upper outlet 20. For further example, two downpipes 44 may be located in the first and last area of the sparger 50. In this way, more gas is provided to the first and last areas of the sparger 50 and these areas therefore emit more frequent bursts of bubbles. As a further option, a parallel array of multiple spaced apart spargers 50 may be provided below a cassette of membrane modules with each sparger 50 connected to a common inlet gas supply pipe. All areas of the first and last sparger 50 may have larger or additional upper outlets 20 (relative to the intermediate spargers 50) or two downpipes 44. In this way, the outer spargers 50 will receive a larger gas flow rate and discharge bubbles more frequently on average than intermediate spargers 50. These intentional special variations in discharge frequency can be used to better match the output of one or more spargers 50 to the sparging needs of different areas of a module or cassette. For example, with a large cassette that is generally rectangular in plan view, an even distribution of gas bubbles tends to produce a stronger air lift or chimney effect through the center of the cassette. An optimal time averaged flow rate of bubbles for the centre of the cassette may not be sufficient to inhibit fouling of membranes near the periphery of the cassette. In this case, providing more frequent bubble discharges from the first and last sparger 50, or the first and last area of the spargers 50, or both, provides a greater time averaged flow rate of bubbles to the peripheral membranes without unnecessarily increasing the flow of bubbles in the center of the cassette. More frequent discharge from a row of conduits 52 can also be provided by adding an additional gas distribution pipe 18 in communication with that row of conduits 52. Such an additional gas distribution pipe 18 may be perpendicular to other gas distribution pipes 18 or manifolds 40.

Figure 9:
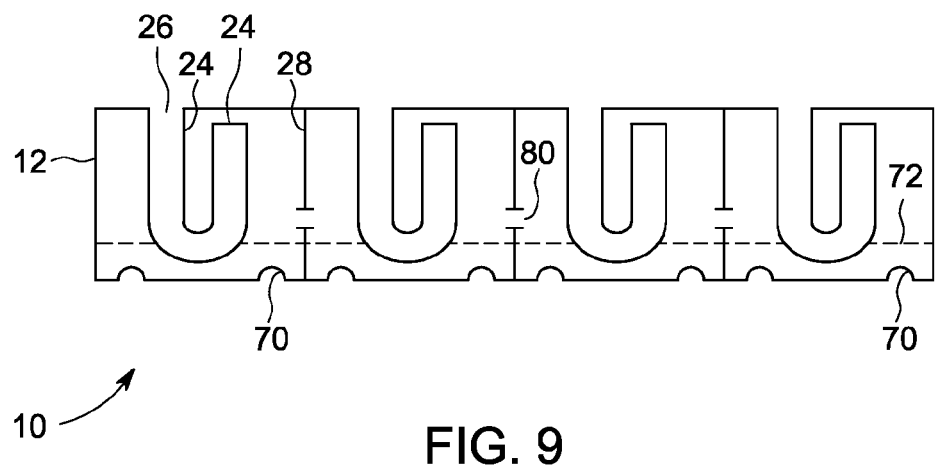
FIG. 9 shows a side view of another sparger with the side nearest the viewer removed.

Referring to FIG. 9, the lower edge of the housing 12 may be provided with one or more optional scallops 70 or other holes or indentations in the sides of the housing 12. The scallops 70 are located below a low water line 72 representing the lowest expected elevation of the interface between the gas and the water in the sparger 10. When the gas pocket expands to the low water line 72, the conduit 22 opens to release gas, which prevents further lowering of the gas to water interface. Accordingly, the gas pocket will not normally extend downwards to reach the tops of the scallops 72. However, it is possible that a conduit 20 may become plugged in use, for example due to an accumulation of hair, trash or dried solids. If a conduit 20 is plugged, a pocket of gas will grow in the plugged area of the sparger 10 until the gas reaches the scallops 70. The scallops 70 then provide multiple bubble forming discharge points so that the plugged section of the sparger 10 will function like a regular aerator until the plug is removed. The presence of bubbles from the scallops 70 may be visible from the surface to indicate that a conduit 20 has been plugged. The elevation of the low water line 72 is related to the input gas flow rate and, in particular, moves downwards when the input gas flow rate is increased. The scallops 70 may also be used to provide a controlled gas overflow from the sparger 10 at very high input gas flow rates.

FIG. 9 also shows optional ports 80 through the dividers 28. The ports 80 are located near but at least partially above the low water line 72. The ports 80 provide an air passage between adjacent areas of the sparger 10 when the gas pocket in at least one of the areas extends downwards to a port 80. The port 80 allows gas to move from one area of the sparger 10 that is about to release bubbles into an adjacent area. This causes the gas pockets in multiple areas of the sparger to equalize in size before the gas pocket in any individual area reaches the low water line. Once all of the areas connected through the ports 80 contain a gas pocket extending to the ports 80, the gas pockets in all of the areas continue to grow until they reach the low water line 72 and release bubbles generally at the same time.

In the absence of the ports 80, each area of the sparger 10 operates primarily independently. Because the areas of the sparger 10 are generally of the same size and receive generally the same input air flow, the fill and release cycle time of each area of the sparger 10 is generally the same. However, small differences in the precise time at which gas is released in one area of the sparger 10 relative to another tend to accumulate over multiple fill and release cycles until the different areas of the sparger 10 no longer release bubbles at the same time. With the ports 80, although there may be still be some variation in the time taken for each gas pocket to expand from the bottom of the ports 80 to the low water line 72, this time variation is small and is not cumulative over multiple fill and release cycles of the sparger 10. A time delay between the release of bubbles from adjacent areas of the sparger 10 is thereby reduced. Sufficiently large ports 80 may cause the release of bubbles to be nearly synchronized between two or more areas of the sparger 10. However, the ports 80 should not be made too large since there is a possibility, particularly if the sparger 10 is not level, of one conduit 20 releasing gas earlier than another and pulling sufficient air through the port 80 to prevent the gas pocket in an adjacent area from reaching the low water level 72. Optionally, the ports 80 may be replaced by other passage forming means such as an indentation in the lower edge of a divider 28 or by raising the lower edge of the divider 28 above the low water line 72. Further optionally, tubes may be used to connect adjacent spargers 10 to reduce a time delay between spargers 10.

Despite the description above, it is not clear if or when synchronizing the bubble bursts from different areas of a sparger 10 is desirable. However, the inventors have observed that the cleaning effect of large bubbles seems to be greater when the bubbles are released into still water. It is therefore desirable to avoid creating air lift effects in the sparger 10 or in a module above the sparger 10. If the discharge of bubble bursts at different times from different areas of a sparger 10 causes there to be a flow of bubbles from some part of the sparger 10 at most times, then the water may develop a persistent upwards velocity through a membrane module located over the sparger 10. In that case, synchronizing the release of bubbles may create a sufficiently long period of time without bubbles to allow the water to settle between subsequent bursts and improve membrane cleaning.

Various other apparatus and process may also be made or used within the scope of the invention which is defined by the following claims. For example, but without limitation, the apparatus elements and process steps of the various examples described above may be combined together in any workable permutation or combination.

We claim:

1. A process for gas sparging a membrane module immersed in a liquid in a membrane system, the process comprising the steps of,
   a) immersing a sparger in the liquid, the sparger having a conduit with an outlet from the sparger and an inlet, the inlet in communication with a chamber defined by the sparger and adapted to hold a pocket of gas in the liquid, the conduit having a low point between the inlet and outlet; and,
   b) feeding gas into the sparger at a specified minimum rate sufficient to cause bubbles to emerge from the outlet at least once every 30 seconds;
   c) observing or calculating a membrane system operating parameter while operating the membrane system to withdraw permeate during a series of polling intervals;
   d) feeding gas into the sparger at a pre-selected increased rate in a subsequent polling interval if the membrane system operating parameter crosses a first specified threshold value while feeding gas into the sparger at the specified minimum rate in a polling interval; and,
   e) feeding gas at the specified minimum rate in another subsequent polling interval if the membrane system operating parameter crosses a second specified threshold value while feeding gas into the sparger at the pre-selected increased rate in another polling interval.

2. The process of claim 1 further comprising a step of diffusing or distributing the bubbles after they emerge from the outlet.

3. The process of claim 1 further comprising a step of locating the sparger below, beside or in combination with the membrane module.

4. The process of any of claims 1 to 3 wherein gas is fed into the sparger at the specified minimum rate and at the pre-selected increased rate such that bubbles emerge from the outlet in a burst once every 2 to 20 seconds.

5. A process for gas sparging membrane modules immersed in a liquid, the process comprising the steps of,
   a) immersing a first sparger and a second sparger in the liquid below the membrane modules, each of the first and second spargers having a conduit with an outlet from the sparger and an inlet, the inlet in communication with a chamber defined by the sparger and adapted to hold a pocket of gas in the liquid, the conduit having a low point between the inlet and outlet; and,
   b) feeding gas into the first and second spargers at a rate sufficient to cause bubbles to emerge from the outlet at least once every 30 seconds;
   c) wherein the second sparger is optionally integral with or separate from the first sparger; and,
   d) flowing gas from the pocket of gas in the first sparger to the chamber of the second sparger to thereby reduce a time delay between the release of bubbles from the first and second spargers.

6. The process of claim 1 wherein the membrane system operating parameter is selected from the group consisting of resistance, transmembrane pressure, permeability, flux, solids concentration, temperature and mathematical combinations or conversions thereof.

* * * * *

UNITED STATES PATENT AND TRADEMARK OFFICE
CERTIFICATE OF CORRECTION

PATENT NO. : 9,433,903 B2
APPLICATION NO. : 13/394104
DATED : September 6, 2016
INVENTOR(S) : Cumin et al.

Page 1 of 2

It is certified that error appears in the above-identified patent and that said Letters Patent is hereby corrected as shown below:

In the Specification

In Column 3, Line 53, delete "dividers 18" and insert -- dividers 28 --, therefor.

In Column 4, Line 42, delete "conduit 12," and insert -- conduit 22, --, therefor.

In Column 5, Line 50, delete "cup 54," and insert -- cup 56, --, therefor.

In Column 5, Line 61, delete "cup 54 and cover section 60." and insert -- cup 56 and cover section 66. --, therefor.

In Column 5, Line 62, delete "cups 54" and insert -- cups 56 --, therefor.

In Column 6, Line 12, delete "downpipe 40" and insert -- downpipe 44 --, therefor.

In Column 6, Line 66, delete "openings 20" and insert -- openings 46 --, therefor.

In Column 8, Line 48, delete "scallops 72." and insert -- scallops 70. --, therefor.

In Column 8, Line 49, delete "conduit 20" and insert -- conduit 22 --, therefor.

In Column 8, Line 51, delete "conduit 20" and insert -- conduit 22 --, therefor.

In Column 8, Line 58, delete "conduit 20" and insert -- conduit 22 --, therefor.

In Column 9, Line 31, delete "conduit 20" and insert -- conduit 22 --, therefor.

Signed and Sealed this
Fourteenth Day of March, 2017

Michelle K. Lee
*Director of the United States Patent and Trademark Office*

CERTIFICATE OF CORRECTION (continued)
U.S. Pat. No. 9,433,903 B2

In the Claims

In Column 10, Line 4, in Claim 1, delete "of," and insert -- of: --, therefor.

In Column 10, Line 39, in Claim 5, delete "of," and insert -- of: --, therefor.